NONDESTRUCTIVE-READOUT MEMORY DEVICE

Filed July 15, 1966 2 Sheets-Sheet 1

INVENTORS
EUGENE E. CASTELLANI
GEORGE E. KEEFE
LUBOMYR T. ROMANKIW

BY Charles P. Boberg
ATTORNEY

FIG. 4
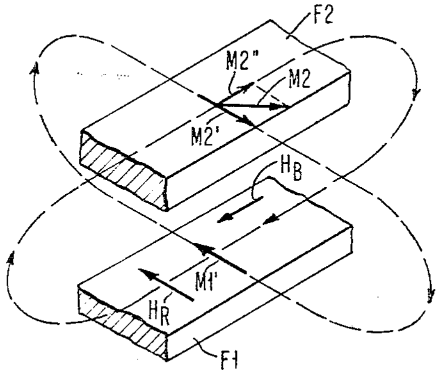
FIG. 5
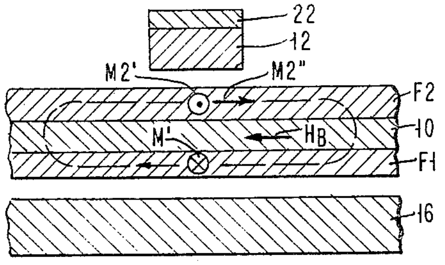
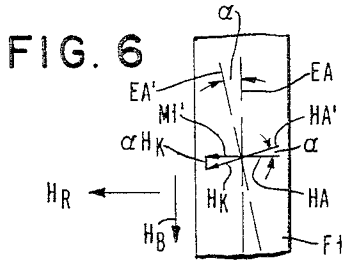
FIG. 6
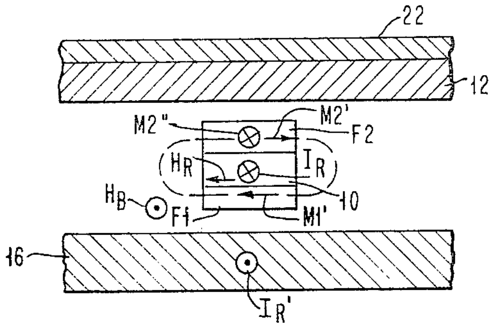
FIG. 7
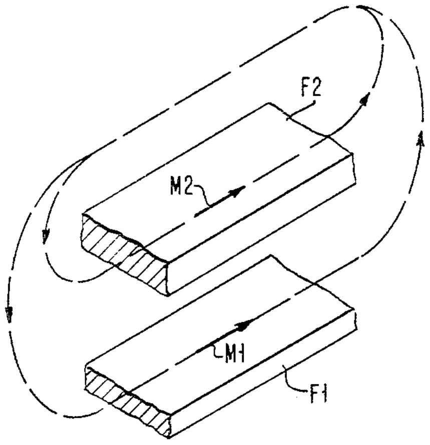
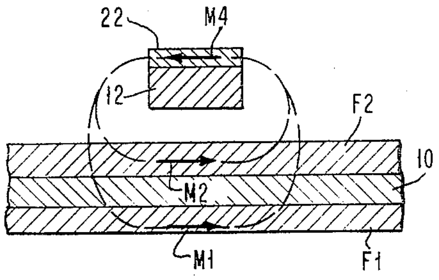
FIG. 9
FIG. 8

United States Patent Office 3,483,534
Patented Dec. 9, 1969

3,483,534

NONDESTRUCTIVE-READOUT MEMORY DEVICE

Eugene E. Castellani, Putnam Valley, George E. Keefe, Montrose, and Lubomyr T. Romankiw, Millwood, N.Y., assignors to International Business Machines Corporation, Armonk, N.Y., a corporation of New York Filed July 15, 1966, Ser. No. 565,505
Int. Cl. G11b *5/00*
U.S. Cl. 340—174 3 Claims

ABSTRACT OF THE DISCLOSURE

A nondestructive-readout memory device of the coupled-film type in which a closed-flux (antiparallel) condition is maintained during readout operations as well as at all other times except during a write operation. The coupled magnetic films are positioned on opposite sides of the word line and have easy axes that extend approximately parallel with such line. These films have sufficiently different anisotropy properties (by being made of different thicknesses, for example) so that the magnetization of one film does not rotate as rapidly or as far as the magnetization of the other film during readout. The film with the least rotation then restores both itself and the other film after readout. During a write operation the magnetization vectors of the films point in the same direction, but an ensuing read pulse places them in a particular antiparallel relationship, as determined by the condition of the controlling film.

This invention relates to nondestructive-readout memory devices of the type which employ coupled magnetic films.

Coupled-film memory devices have been extensively proposed for use in both destructive-readout (DRO) and nondestructive-readout (NDRO) modes of operation. In the NDRO type of operation the stored information is retained following each readout thereof. The principal advantage of using coupled films as information storage devices is that they are more economical to operate than single flat films. In nearly all instances the magnetic films which are employed in memory devices have uniaxial anisotropy, which provides each film with an "easy" axis along which it may retain magnetization after the removal of the applied field and a "hard" axis, at right angles to the easy axis, along which the film is unable to retain magnetization after the removal of the applied field.

When employed in DRO operations, coupled films generally are made as nearly alike as possible in their operational characteristics. Such coupled-film DRO operations may be further divided into closed-easy-axis (CEA) and closed-hard-axis (CHA) modes of operation. In the CEA mode the remanent magnetizations of the two films normally are coupled in antiparallel relationship along their easy axes, through the respective stray fields of the films. However, when the magnetizations of the films are rotated into their hard-axis positions, in response to the application of a transverse field thereto, the films are uncoupled because their respective magnetizations now are parallel rather than antiparallel. In the CHA type of operation, as it usually is practiced, the films are coupled while their respective magnetizations are in their hard-axis positions (due to the antiparallel orientations thereof) but are uncoupled while their respective magnetizations are in their easy-axis positions, where they have a parallel rather than an antiparallel relationship.

The CHA and CEA modes of operation have certain advantages with respect to each other. The CHA mode is particularly attractive from the standpoint that it requires less read drive power to yield a given output signal than does the CEA mode. However, as far as is presently known, the CHA mode of operation has not heretofore been considered adaptable, as a practical matter, to nondestructive readout (NDRO) operations. NDRO memory operations customarily are performed with dissimilar films in such a manner that a closed-hard-axis coupling is not, or cannot be, achieved therein. Conventional NDRO film memory cells tend to have rather weak outputs in proportion to the driving power required to produce such outputs.

An object of the present invention is to adapt the closed-hard-axis (CHA) principle of operation to nondestructive readout purposes, so as to obtain the advantages of CHA operation in an NDRO mode.

A further object of the invention is to provide an improved NDRO film memory device which affords some of the advantages of both CHA and CEA operational modes.

The objectives just stated are herein attained in a modified CHA memory device wherein the upper film of each film pair has a thickness substantially exceeding that of the lower film. The procedure for writing information into this device basically follows the known CHA writing practice, except that in this instance the write pulse always is followed by a pulse resembling a read pulse (as part of the write operation) for a purpose to be explained hereinafter. However, the reading operation departs very significantly from known CHA reading techniques, due to the disparity in film thickness. Passage of a read current pulse through the "word line" sandwiched between the two films causes the magnetization of the thinner bottom film to rotate rapidly through approximately ninety degrees, but the magnetization of the thicker top film is rotated more slowly and through an angle of much less than ninety degrees. The magnetization of the thick top film ultimately will occupy an angular position such that its hard-axis component is just sufficient to close the stray flux of the thin bottom film. In this angular position the top film magnetization still has a substantial component thereof extending in its original direction along the easy axis of this film. Such easy-axis component will provide a bias field that is effective, upon termination of the read operation, to rotate the respective magnetizations of both films into antiparallel easy-axis positions, wherein the magnetization of the bottom film closes part of the stray flux of the top film. The film magnetizations will return to these same positions following each successive read operation (provided there is no intervening write operation), thereby affording a nondestructive readout. This particular type of NDRO operation produces relatively strong output signals in proportion to the driving power.

The foregoing and other objects, features and advantages of the invention will be apparent from the following more particular description of a preferred embodiment of the invention, as illustrated in the accompanying drawings, wherein:

FIGS. 4 to 7 are various schematic views depicting the operation of a bit storage device at a time when information is being read therefrom in accordance with the teachings of the invention.

FIGS. 8 and 9 are views similar to FIGS. 2 and 3, respectively, but showing a magnetic state which the bit storage device may assume during a writing operation.

Figure 1:
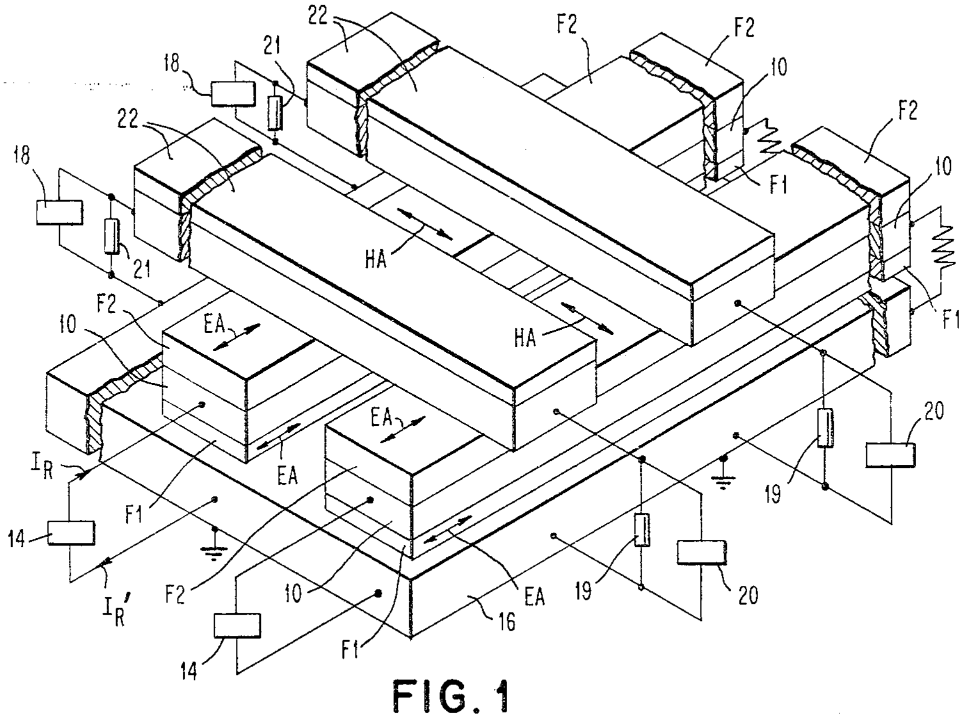
FIG. 1 is a simplified schematic view showing a word-organized nondestructive-readout memory system of a modified CHA type embodying the principle of the invention.

Referring now in detail to the apparatus illustrated in FIG. 1, the word-organized memory array shown in this view includes a parallel set of conductive word lines 10 arranged in orthogonal relation to a parallel set of conductive bit-sense lines 12. Only a few lines of each set are shown in this view. Each of the lines 10 and 12 is in the form of an elongated strip of conductive material, such as copper. Plated or coated onto the lower and upper surfaces, respectively, of each word strip 10 are magnetic films F1 and F2, composed of a uniaxially anisotropic magnetic material such as permalloy (a nickel-iron alloy having, for example, approximately 80% Ni and 20% Fe). The films F1 and F2 are in the form of elongated strips which are substantially coextensive with the word line 10 that is sandwiched between them.

Each of the films F1 and F2 has an easy axis of remanent magnetization EA which extends lengthwise of this film strip, and it has a hard axis of magnetization HA which extends at right angles to the easy axis EA thereof. Although the constituent films F1 and F2 of each film pair are illustrated as being separated at their longitudinal edges by the thickness of the intervening word line 10, the edges of these film strips may be brought closer together in practice, or they may be effectively bridged by the application of edge plating to the word lines 10. Nevertheless, it is convenient herein to regard the films F1 and F2 as separate magnetic bodies, for reasons which will become apparent as the description proceeds.

Each of the word lines 10 is adapted to conduct pulses of word current during both reading and writing operations of the memory system. The word current pulses are supplied by appropriate word drivers 14 respectively connected to the word lines 10. During read operations (with which the present description primarily is concerned) selected ones of the word lines 10 receive pulses of read current $I_R$ (sometimes referred to as "interrogating" current) supplied by the respective word drivers 14. These read current pulses are returned through a conductive ground plane 16, which serves as a common ground return for all of the conductive array lines in the memory system. The return or image current in this instance is indicated by the reference character $I_R'$, FIGS. 1 and 7. In practice the ground plane 16 is coated on its upper surface with a layer of insulating material (not shown) which separates it from the lower films F1 of the various film pairs. During write operations the word lines 10 are pulsed by either the drivers 14 or by separate drivers (not shown herein).

The bit-sense lines 12 serve a dual purpose, being utilized during the reading operations as sense signal conductors and being utilized during writing operations as bit current conductors. The bit-sense lines 12 are insulated from the upper films F2, across which they extend, by suitable layers of insulating material (not shown). Each of the lines 12 is coupled electrically to a sense amplifier (utilized in reading operations) and to a bit driver 20 (utilived in writing operations). The ground plane 16 provides return paths for both the sense signals and the bit currents. The writing and reading operations will be described in detail hereinafter. It should be understood that the electrical connections between the bit-sense lines 12 and their respective sense amplifiers 18 and bit drivers 20 are only schematically represented in FIG. 1, which does not purport to show an actual memory array construction. The reference characters 19 and 21 indicate line terminating and/or switching devices of known types which are associated with the bit-sense lines 12 for use during reading and writing operations, respectively, in a well-known manner.

The bit-sense lines 12 are coated or plated on their upper sides with keeper films 22 of magnetic material. These keeper films 22 can be made of metallic magnetic materials, such as permalloy, or non-metallic magnetic materials, such as ferrite compositions. If desired, the individual keeper films 22 can be replaced by a single sheet of keeper material which overlies all of the bit-sense lines 12. The function of the keepers 22 will be explained subsequently herein.

Figure 2:
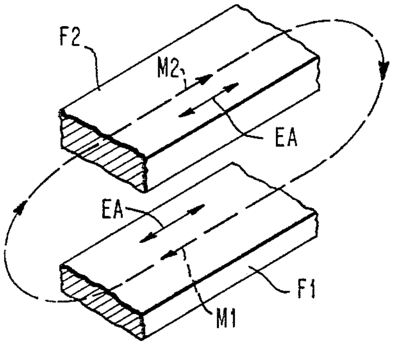
FIG. 2 is a fragmentary perspective view showing a pair of magnetic film strips which may be utilized in a bit storage device of the kind contemplated by the present invention, indicating the manner in which these films normally are coupled together in their quiescent state between reading operations.
Figure 3:
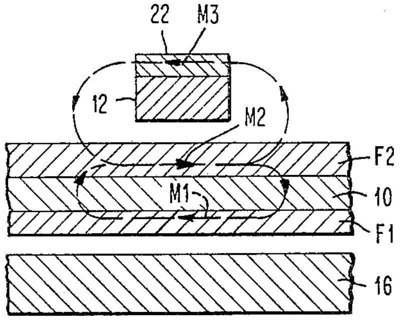
FIG. 3 is a fragmentary vertical section of the film strips and associated structure, showing the normal quiescent state of the films between reading operations.

FIGS. 2 and 3 show in schematic fashion certain portions of two magnetic film strips F1 and F2 which are located at a cross-over point between a word line 10 and a bit-sense line 12. The portion of the film pair F1–F2 in the vicinity of this cross-over point is considered to be an individual bit storage cell or position, there being as many such cells or positions as there are cross-over points between the various word lines 10 and bit-sense lines 12. FIGS. 2 and 3 represent the magnetic states of the lower and upper films F1 and F2 while they are in their normal quiescent condition between reading operations. (It will be explained subsequently herein how the films F1 and F2 are placed in this condition as the result of a write operation followed by a read operation.) Assuming that each of the film strips F1 and F2 has an easy axis EA extending lengthwise thereof, the films F1 and F2 respectively have remanent magnetization vectors M1 and M2 that normally are disposed along their respective easy axes EA in antiparallel positions.

The aforesaid antiparallel relationship of the magnetization vectors M1 and M2 results from the fact that each of the films F1 and F2 is in the stray magnetic field of the other film so that it partially closes the flux return path of that film. Thus, the easy-axis flux paths of the two films F1 and F2 in their normal quiescent state are considered to be "closed," notwithstanding the fact that the stray flux must pass through the thickness of the nonmagnetic wordline conductor 10 while pasing from one film to the other film. The direction in which each vector M1 and M2 points is indicative of the binary 1 or 0 value which is stored in that particular bit storage position. For instance, the magnetization vectors M1 and M2 may assume the positions thereof shown in FIG. 2 when the cell is storing a binary 1, whereas these vectors will point respectively in opposite directions if the cell is storing a binary 0.

In the present description it is assumed that the films F1 and F2 are made of identical magnetic material, and in order to impart nondestructive readout characteristics to the film cell, the top film F2 is made thicker than the bottom film F1. Hence, the stray flux of the top film F2 exceeds that of the bottom film F1. A portion of the stray flux from film F2 which does not close through the film F1 will be closed through the keeper 22 associated with the bit-sense line 12, which passes above the magnetization vectors M1 and M2. This is indicated in FIG. 3 by the magnetization vector M3 passing transversely through the keeper 22. Thus, to recapitulate, in the normal quiescent state of the bit storage device illustrated in FIG. 2 and 3, the stray flux of the bottom film F1 is closed through the top film F2, while the stray flux of the top film F2 closes partly through the bottom film F1 and partly through the keeper 22 situated thereabove.

The films F1 and F2, being in the form of elongated narrow strips, have an inherent shape anisotropy due to their geometry which tends to provide each film with an easy axis extending lengthwise thereof. In addition to this, each film strip, during its formation, is subjected to a magnetic field oriented so as to induce in such film an easy axis extending lengthwise of the strip. The bottom film F1, being relatively thin (less than 1,000 A. thick), behaves essentially as a single magnetic domain within the region of each bit storage position which is defined therein. Although this film is physically made as one continuous strip, it may function as a series of discrete film spots spaced longitudinally along the strip, each spot having its individual magnetization according to the binary bit value stored therein. The top film F2, has a thickness such that if it had no shape anisotropy, it would tend to be at least partially self-demagnetizing. having a narrow elongated shape extending in the direction of its induced easy axis EA, however, the film F2 is able to maintain a substantially unidirectional magnetization M2 while in its quiescent state, without producing any split-up partially demagnetized domains at any of the bit storage locations therein. In addition to having this desirable effect, the long strip formation of the magnetic films lends itself readily to mass fabrication methods.

In the foregoing description attention was given to the normal quiescent state of the bottom and top films F1 and F2 between reading operations. Attention now will be given to the behavior of these films during a typical read operation. Assuming that a selected word of stored information is to be read nondestructively out of the memory, the appropriate word driver 14, FIG. 1, is activated to send a pulse of read current $I_R$ through the corresponding word line 10. As indicate in FIG. 7, the read current pulse $I_R$ which passes through the word line 10 is returned through the ground plane 16 as the image current $I_R'$, which is of opposite polarity. Hence, the bottom film F1, in effect, is enclosed by a single-turn driving loop consisting of the word line 10, the ground plane 16, and the intermediate electrical connection between these two conductors. Within this loop, the read current pulse establishes a transverse read field $H_R$, FIGS. 4 and 7, the duration of which is determined by the pulse length. In the present description attention will be given only to the portion of the read field $H_R$ which exists between the word line 10 anad the ground plane 16, this being the portion of the read filed $H_R$ which is applied to the bottom film F1. To a certain extent, the read field also directly affects the upper film F2. For convenience, however, it will be assumed herein that the top film F2 is switched primarily by the stray field from the bottom film F1.

The magnetization M1 of the bottom film F1 is switched by the transverse read field $H_R$, causing the vector M1 to rotate from the quiescent easy-axis position thereof shown in FIG. 2 into the transverse position M1' thereof shown in FIG. 4, wherein it is aligned with the read field $H_R$. If the easy and hard axes of the film strip F1 are perfectly oriented, the vector position M1 will coincide with the hard axis of the film F1. Otherwise, there will be a slight angular displacement between the rotated vector position M1', and the hard axis of the film F1. This latter condition will be treated in detail hereinafter.

While the foregoing condition is being established, the stray magnetic field of the bottom film F1, which is antiparallel to the transverse magnetization vector M1', FIGS. 4, 5 and 7, is applied to the top film F2 for switching the same. However, inasmuch as the top film F2 is considerably thicker than the bottom film F1, the magnetization vector M2 of the top film F2 is rotated through an angle considerably less than 90°, as can be seen from a comparison of FIG. 2 with FIG. 4. In its partially rotated postion show in FIG. 4 the vector M2 has a component M2' extending transversely of the film strip F2 in antiparallel relationship with the rotated vector M1' of the film F1, and it has another component M2'' extending lengthwise of the film strip F2. The transverse magnetization component M2' (which is antiparallel to M1') represents that portion of the top film magnetization which closes the flux of the bottom film F1 during the application of the read field $H_R$. The longitudinal component M2'' of the top film magnetization has a stray flux component which applies a longitudinal bias field $H_B$, FIGS. 4, 5 and 7, to the bottom film F1. The bias field vector $H_B$ represents the minimum value of the stray field which is supplied by the top film F2 to the bottom film F1, longitudinally thereof, throughout most operations of the illustrated device.

Each bit-sense line 12, FIG. 1, is part of a pickup or sense loop that also includes the associated sense amplifier 18, the ground plane 16 and the associated terminating element 19. A signal voltage is induced in this loop whenever there is a change in the net flux linking it. Normally, with the films F1 and F2 being so coupled that their magnetization vectors M1 and M2 are in antiparallel relationship as shown in FIGS. 2 and 3, these two vectors effectively nullify one another, and the only net flux linking the sense loop at each bit storage position is the excess stray flux of the thicker top film F2, which is closed through the keeper 22 as indicated at M3, FIG. 3. When the bottom film magnetization is rotated from its normal position M1 into its transverse position M1', FIGS. 4, 5 and 7, this tends to increase the next flux linking the sense loop, but this effect is offset to some extent by the corresponding rotation of the opposing top film magnetization M2. However, since the top film F2 is thicker than the bottom film F1, its vector M2 rotates much more slowly than does the vector M1; hence, the more rapid rotation of M1 has the effect of suddenly subtracting the vector M1 at an instant when a large component of the magnetization M2 is still effectively linking the sense loop. Accordingly, a sense signal is induced in the sense loop and is manifested at the output of the sense amplifier 18.

When the read current pulse $I_R$ terminates, the longitudinal magnetization component M2'', FIGS. 4 and 5, provides a magnetic force for longitudinally restoring the magnetization vector M2 of the top film F2, causing this vector M2 to rotate back into the normal position thereof illustrated in FIG. 2. At the same time, the corresponding stray bias field $H_B$ acting upon the bottom film F1, FIGS. 4, 5 and 7, longitudinally restores the bottom film magnetization from the position M1' thereof into the normal position M1 thereof shown in FIG. 2. Thus, due to the fact that the upper film magnetization M2 is only partially rotated by the application of the transverse read field $H_R$, the magnetizations of the films F1 and F2 are restored to their normal antiparallel or stray-field coupled relationships shown in FIGS. 2 and 3, at the end of each read current pulse.

If the easy and hard axes of the bottom film F1 were perfectly oriented, the longitudinal bias field $H_B$ required to effect restoration of the bottom film magnetization could be made vanishingly small. As a practical matter, however, due to the unavoidable effects of easy-axis dispersion and skew which may inadvertently be introduced during the formation of each film, the easy axis of the film F1 actually may occupy a position EA', FIG. 6, which is displaced by an angle $\alpha$ from the theoretical easy-axis position EA. The actual hard-axis position HA' likewise is displaced by an angle $\alpha$ from the theoretical hard-axis position HA. Consequently, when the bottom film magnetization is rotated into the transverse position M1', this vector is displaced by the angle $\alpha$ from the actual hard axis HA' of film F1. In the worst case, this will create a tendency for the bottom film magnetization to rotate in a direction opposite to the intended direction when the read field terminates. To overcome such tendency, the longitudinal bias field $H_B$ supplied to the bottom film F1 by the top film F2 should have a magnitude at least equal to $\alpha H_K$, where $H_K$ is the anisotropy field of the bottom film F1, and $\alpha$ is the aforesaid displacement angle, measured in radians.

As a practical example, the value of $\alpha H_K$, in the worst anticipated case, may be around 0.3 oersted. This assumes a maximum value of 0.05 radian (approx. 3°) for $\alpha$, and a value of 6 oersteds for $H_K$. For magnetic films having a thickness of approximately 1,000 A. and a bit length in the easy direction of 30 mils, the stray demagnetizing field is on the order of 1 oersted. Since the stray field of the upper film F2 must be increased by 0.3 oersted in order to overcome the $\alpha H_K$ of the bottom film F1, as just explained, then the top film F2 must have a thickness at least 30% greater than that of the bottom film in order to provide a biasing field $H_B$ at least equal to $\alpha H_K$. This is the minimum difference which should exist between the respective film thicknesses for accomplishing nondestructive readout under the conditions just stated.

Attention now will be given to a typical writing operation involving the illustrated film storage device. In a word-organized memory array such as the one disclosed herein, an entire word-line of information is entered during each writing operation. A word driver 14, FIG. 1 (or a separate write word driver) sends an appropriate write current pulse through the selected word line 10. The write current pulse is of sufficient strength to rotate the magnetizations of both films fully into alignment with the transverse write field. At approximately the same time, the various bit drivers 20 are activated to send bit current pulses of appropriate polarities through their respective bit-sense lines 12. The bit current pulses terminate after the word current pulse has terminated. In a well-known manner, this action causes the portions of the magnetic film strips F1 and F2 at the various bit storage positions to become respectively magnetized in directions longitudinally of each strip which are determined by the 1 or 0 polarities of the respective bit currents in the bit-sense lines 12. As a result of this writing operation, the magnetizations M1 and M2 of the bottom and top film strips F1 and F2, respectively, assume like polarities longitudinally of these strips, as indicated in FIGS. 8 and 9. At this stage of the writing operation, the stray flux of the bottom film F1 no longer closes through the top film F2. Instead, the stray flux of both films is closed through the keeper film 22 located above the associated bit-sense line 12 at each of the bit storage cells situated on the word line under consideration, as indicated by the vector M4, FIG. 9.

The film magnetizations M1 and M2 are permitted to remain in the parallel relationship just described for only a short time. Immediately after the films have attained this state, a pulse resembling a read pulse is sent through the word line 10, as a final phase of the write operation. This pulse generates a field which performs a function similar to that of the read field $H_R$, placing the film magnetizations M1 and M2, respectively, into the positions M1' and M2 shown in FIG. 4. At the end of this operation, the self-restoring action of the upper film F2 returns the magnetization vector M2 into its previous position but biases the magnetization vector M1 into an antiparallel position, as indicated in FIG. 2. Thus, the condition illustrated in FIGS. 8 and 9 no longer exists after the full write operation has been concluded. Thereafter, any desired number of nondestructive read operations may be performed in the manner explained hereinabove.

The present teachings thus make it possible to perform nondestructive readout with a coupled-film memory device that is basically of the closed-hard-axis (CHA) type, such a device usually being employed only in destructive-readout operations. In this way, it is possible to provide NDRO while realizing some of the important advantages (such as reduction of word currents) that are inherent in the CHA mode of operation. At the same time, the invention also provides some of the advantages such as bit cell stability that are associated with a closed-easy-axis (CEA) type of operation. The disclosed apparatus is relatively easy to fabricate, since it differs physically from a normal CHA array only in that the top films are purposely thickened. The tolerances on film thickness are not critical. If desired, the requisite difference between the respective properties of the top and bottom films can be obtained by making these films of different magnetic materials, not necessarily of different thicknesses.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A nondestructive-readout memory device comprising:

an interrogation line for conducting pulses of current each effective to establish a read field of predetermined intensity at right angles to said line, said read field being oppositely directed on opposite sides of said line;

a pair of anisotropic magnetic films respectively disposed on opposite sides of said line, each of said films having an easy axis of remanent magnetization extending approximately parallel with said line and a hard axis of remanent magnetization disposed substantially at right angles to said easy axis, said films normally being magnetically coupled to each other through their respective stray fields and each being capable of maintaining a unidirectional magnetization vector therein, said films respectively having dissimilar anisotropy properties such that a read field sufficient to rotate the magnetization vector of the first film into a position substantially ninety degrees from said line causes the magnetization vector of the second film to be rotated into a position substantially greater than zero degrees and substantially less than ninety degrees from said line;

and sensing means linked by the stray magnetic field of said second film for generating an output signal in response to a net change in the magnetic field linked by the said sensing means during the application of the read field.

2. A memory device as set forth in claim 1 wherein said films are composed of substantially identical materials, said second film having a thickness substantially greater than that of said first film.

3. A memory device as set forth in claim 1 wherein the anisotropy properties of said films are such that said angular position of said second film magnetization vector causes the component of said second film magnetization vector which is parallel with said line to furnish to said first film a bias field exceeding $\alpha H_K$, where $H_K$ is the anisotropy field of said first film and $\alpha$ is the angle, measured in radians, by which the hard axis of said first film deviates from a position at right angles to said line.

References Cited

UNITED STATES PATENTS

| | | | |
|---|---|---|---|
| 3,125,745 | 3/1964 | Oakland | 340—174 |
| 3,188,613 | 6/1965 | Fedde | 340—174 |

OTHER REFERENCES

Bertelsen, B. I., Magnetic Storage Device. IBM Technical Disclosure Bulletin, vol. 8, No. 1, June 1965, pp. 148–150.

Ravi, C. G., Magnetic Storage Device. IBM Technical Disclosure Bulletin, vol. 8, No. 1, June 1965, pp. 156–157.

BERNARD KONICK, Primary Examiner

GARY M. HOFFMAN, Assistant Examiner